C. C. McGUIRE.
COUPLING.
APPLICATION FILED JUNE 23, 1913.

1,088,712.

Patented Mar. 3, 1914.

Witnesses

Inventor
Curtis C. McGuire
By C. E. Humphrey
Attorney

UNITED STATES PATENT OFFICE.

CURTIS C. McGUIRE, OF AKRON, OHIO.

COUPLING.

1,088,712.  Specification of Letters Patent.  Patented Mar. 3, 1914.

Application filed June 23, 1913. Serial No. 775,281

*To all whom it may concern:*

Be it known that I, CURTIS C. McGUIRE, a citizen of the United States, residing at Akron, in the county of Summit and State of Ohio, have invented new and useful Improvements in Couplings, of which the following is a specification.

This invention relates to an improved coupling device for uniting instrumentalities such for instance as a tractor and a drawn truck, the object thereof is to provide a simple, durable coupling for the purpose named, and efficient in use to permit the coupling operation and also permit the free swinging of the members coupled together with respect to each other.

The invention more particularly resides in providing a coupling member for supporting the forward end of the reach or bar of the drawn truck to facilitate the coupling and uncoupling operation.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
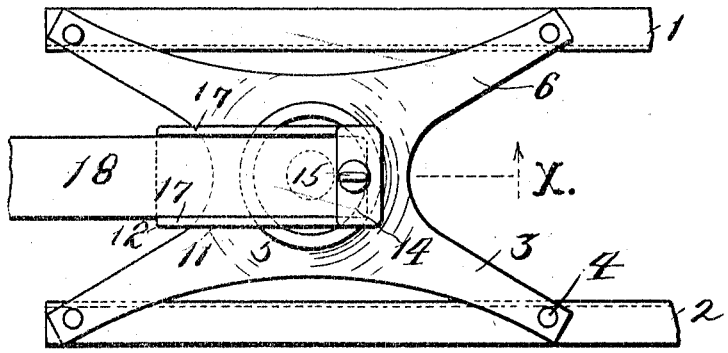
Figure 2:
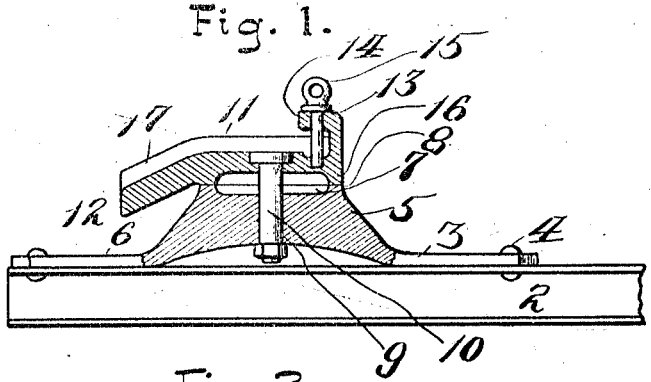

In the drawings in which similar reference numerals indicate like parts in the different figures, Figure 1, is a plan view of my improved coupling showing so much of the frame of a tractor as will illustrate the means for mounting the same; and, Fig. 2, is a vertical section taken on line X of Fig. 1.

Referring to the drawings in detail, the reference numerals 1 and 2 denote the longitudinally-extending side bars of a frame such as an automobile tractor. Mounted on the frame is the fixed member 3 of the coupling held in place by hold-fast devices 4 and provided with an upwardly-extending hub 5 near its center, from which extend a plurality of arms 6 which rest upon the frame bars 1 and 2. In the upper face of the hub portion 5 of the member 3 is a central recess 7 surrounded by an upturned marginal annular ridge 8 constituting a horizontal bearing surface for a purpose to be later described. The hub portion 5 is provided with a central opening 9 in which is a king-bolt 10. The movable element of the coupling embodies a complementary member 11 consisting of an elongated trough-shaped body portion with a depending or downwardly-inclined rear end portion 12. The forward end of the coupling is provided with an upwardly-extending standard 13 the upper portion of which is provided with a horizontal opening 14 spaced from the member 13 and provided with an aperture to receive a pin 15 the lower end of which is suitably anchored in a recess in the lower portion of the member. The under face of the member 11 is provided with a downwardly-turned marginal annular ridge registering with the annular ridge 8 and adapted to engage the same to permit free rotation of the member 11 with respect to its companion member.

Along the marginal portions of the members 11 are two upwardly-extending flanges 17 which form in connection with the floor of the member 11 a seat for a purpose to be later described, and in the space between the marginal flanges 17 is a countersunk opening to receive the head of the king-bolt 10. That portion of the member 11 between the side flanges is adapted to receive the forward end of a reach, bar or tongue 18 of the drawn vehicle and the forward end of the reach is provided with an aperture through which may be passed the pin 15 for securely locking the end of the reach to the movable member 11 yet permitting the reach to swing horizontally under service conditions in unison with the horizontal revolution of the member 11 on the hub 5 as a bearing. The downwardly and rearwardly-inclined portion 12 constitutes a means for sustaining and guiding the end of the reach immediately preceding the coupling operation so that by placing the end of the reach on the inclined portion 12 and backing the tractor or drawing forwardly the drawn truck the end of the reach will slide along the floor of the member 11 until the aperture therein is in registration with the opening in the head 14 of the standard 13, after which the pin 15 may be inserted for completing the coupling operation.

When it is desired to perform the uncoupling operation, a reversal of the foregoing operation is followed out.

I claim:—

1. A coupling embodying a frame provided with an upturned hub the upper face of which constitutes a bearing, said member further provided with an opening for a king-bolt, a movable coupling member mounted on the upper bearing face of said hub, said movable coupling member provided with a forwardly positioned and upwardly extending standard having a head over-hanging the lower portion to provide a recess to receive the end of the reach or bar, and a pin extending through said head and reach for detachably coupling said members together.

2. A coupling for the purpose described embodying a fixed member provided with a central hub, and a king-bolt positioned therein, the upper face of said hub having an annular projection forming a bearing surface, a movable coupling member provided on its under face with an annular projection registering with the upper face of said hub and revolving thereon, said members provided with registering openings to receive a king bolt, an upwardly-projecting standard at one end of said movable member, a recess in said standard to receive the end of a reach or bar of a drawn vehicle, a pin extending through said standard and the end of said reach, the rear portion of said movable member having a downwardly-inclined portion to serve as a supporting and guiding means.

In testimony whereof I have hereunto set my hand in presence of two subscribing witnesses.

CURTIS C. McGUIRE.

Witnesses:
C. E. HUMPHREY,
A. L. McCLINTOCK.